Nov. 17, 1936.  G. KEITH  2,060,993

GAS-FIRED BAKING OVEN

Filed Nov. 19, 1935  3 Sheets-Sheet 1

Inventor
George Keith
By Pennie Davis Marvin Edmonds
Attorneys

Nov. 17, 1936.  G. KEITH  2,060,993
GAS-FIRED BAKING OVEN
Filed Nov. 19, 1935  3 Sheets-Sheet 2

Nov. 17, 1936.    G. KEITH    2,060,993
GAS-FIRED BAKING OVEN
Filed Nov. 19, 1935    3 Sheets-Sheet 3

Inventor
George Keith
By Pennie Davis Marvin & Edmonds
Attorneys

Patented Nov. 17, 1936

2,060,993

UNITED STATES PATENT OFFICE 2,060,993

GAS-FIRED BAKING OVEN

George Keith, London, England, assignor to James Keith & Blackman Company Limited, London, England, a company of Great Britain Application November 19, 1935, Serial No. 50,493 In Great Britain November 1, 1934

3 Claims. (Cl. 158—7)

This invention relates to improvements in gas-fired baking ovens of the type equipped with burners associated with injectors supplied with gas under pressure, and has for an object to provide an equipment which ensures exclusion of dust, which prevents the reflux flow of vapour from the oven through burners which may be temporarily shut off and thereby guards against condensation on, and corrosion of, the cool outer parts, and which compensates for tendency to enrichment of the mixture when the gas supply is diminished. Further objects are to obviate excessive loss of heat at the firing side of the oven, and waste of fan power in overcoming resistance in air piping.

As is understood, the standard type of biscuit or bread oven comprises a baking chamber bounded by an inner wall and an outer wall between which and the inner wall lagging is interposed. Apertures in the two walls are connected by open-ended distance boxes, through which the burners lead to the baking chamber. The injector bodies of these burners are usually fixed exteriorly of the outer wall and are fed with gas from headers or manifolds attached to the outer wall.

An oven according to the present invention is equipped with burners incorporating injectors contrived to draw combustion-supporting air at super-atmospheric pressure from an air space traversed by tubular boxes opening into the interior of the oven, whereby to prevent entry into the burner of dust from the atmosphere or of vapour or products from the oven chamber.

The air space is conveniently formed between an outer wall of the oven and a third wall spaced therefrom, being fed by a fan (or fans), so that there is maintained in said air space an air pressure slightly above atmospheric pressure, say from $\frac{2}{10}$ to $\frac{3}{10}$ of an inch water gauge, constituting only a small portion of the pressure of the mixture set up by the injectors.

Figure 1:
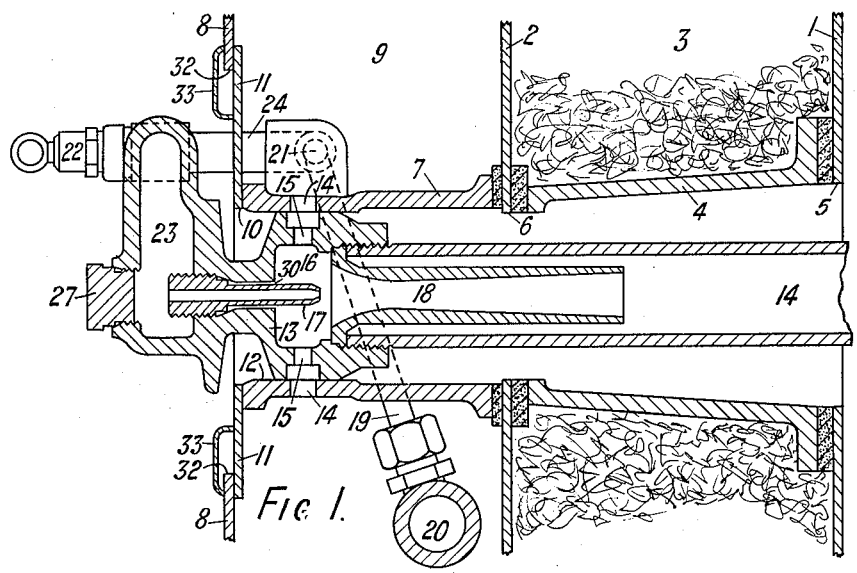
Figure 2:
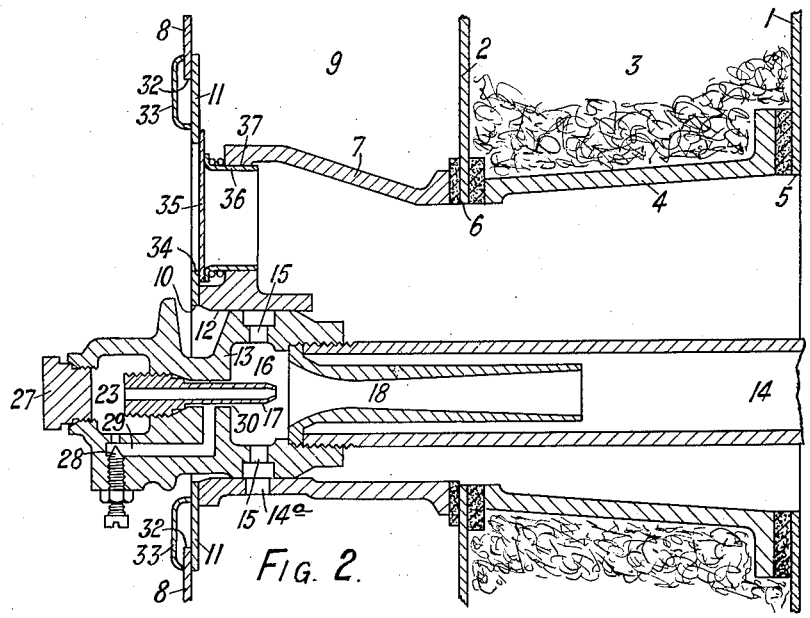
Figure 3:
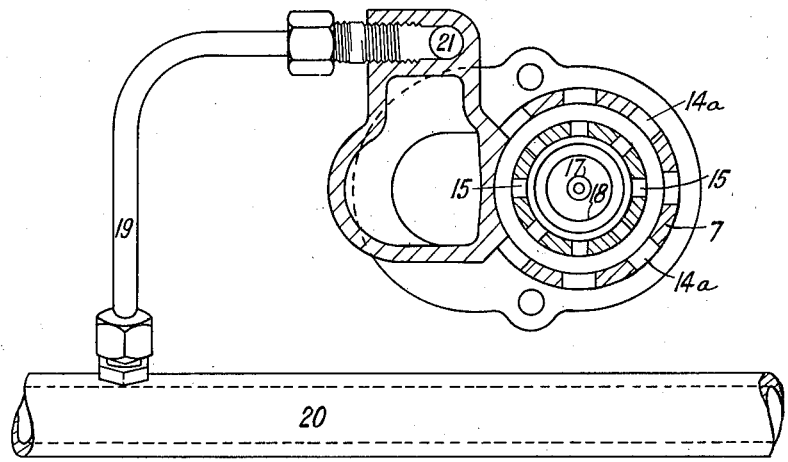
Figure 4:
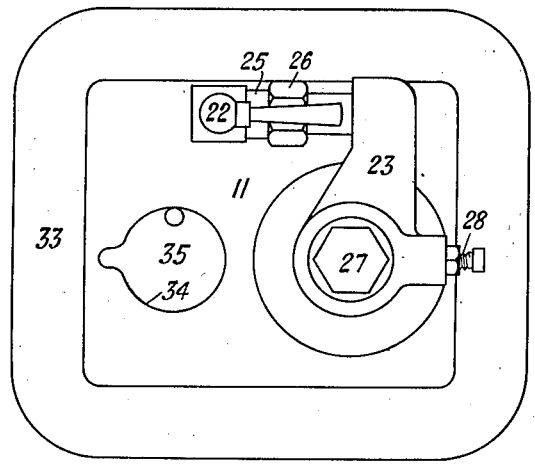
Figure 5:
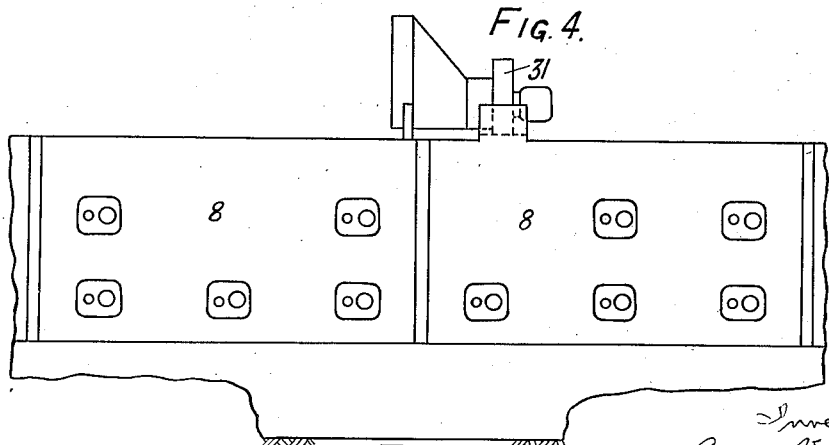
Figure 6:
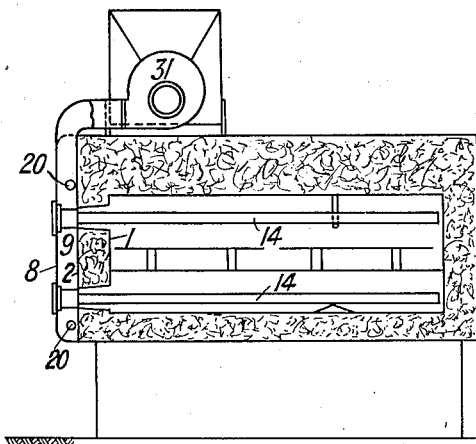
Figure 9:
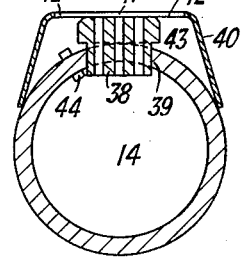
Figure 10:
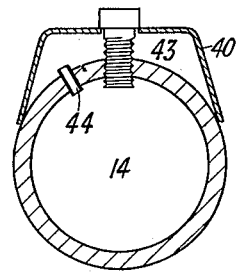
Figure 8:
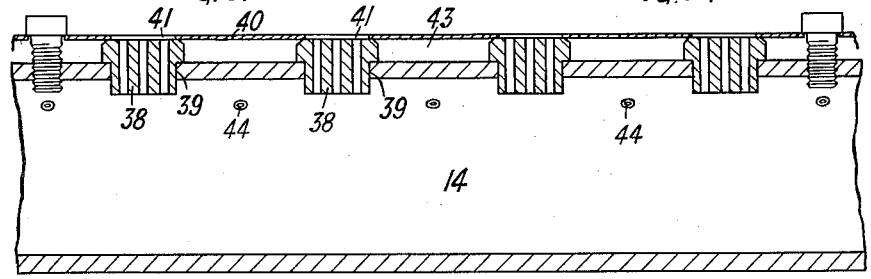
Figure 7:
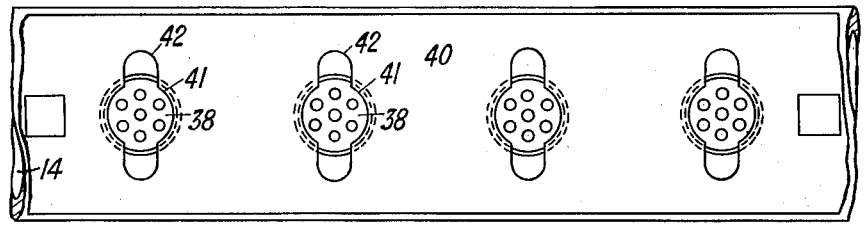

The invention is illustrated in the accompanying drawings in which Fig. 1 is a vertical section and Fig. 2 a horizontal section showing a burner and the associated parts of an oven. Fig. 3 is a vertical section at right angles to Fig. 1 and Fig. 4 is an elevation at right angles to Fig. 1. Fig. 5 is a fragmentary side elevation and Fig. 6 a transverse section of a biscuit oven embodying the invention. Figs. 7–10 are fragmentary detail views of a burner tube.

Referring to the drawings, 1 denotes an inner or baking chamber wall, and 2 denotes the usual outer wall of a baking oven, the walls 1, 2 defining between them a space 3 filled with thermal insulating material. 4 denotes a tubular distance box interposed between the walls 1, 2 so as to interconnect aligned apertures 5, 6 in the walls 1, 2, respectively. Aligned with the distance box 4 is a second tubular distance box 7 interposed between the wall 2 and a third wall 8 defining with the wall 2 an air space 9 which serves as a trunk for supply of combustion-supporting air to the burners for heating the oven, the air pressure within the space 9 being maintained slightly above atmospheric pressure. The box 7 connects the aperture 6 with an aperture 10 in a floating plate 11 abutting on the wall 8 and constituting, in effect, part of the wall 8. The box 7 is formed near its outer end with a machined cylindrical bore 12 for reception of a hollow cylindrical plug 13 forming part of the body of an injector serving a burner tube 14 carried by the plug 13 and extending through the boxes 7, 4 into the interior of the baking chamber. Ports 14ᵃ in the wall of the box 7 connect with ports 15 in the plug 13 to admit combustion-supporting air from the air space 9 into the interior 16 of the plug 13, wherein is provided a removable injector nozzle 17 which discharges a combustible mixture of gas and induced air into the burner tube 14 through a Venturi tube 18 accommodated within the end of the burner tube 14. Gas is taken by way of a pipe 19 from a header or manifold pipe 20 accommodated in the air space 9 to a pocket 21 presented by the box 7, whence it passes to the nozzle 17 by way of a manually operable cock 22 located externally of the wall 8 and connecting the pocket 21 with an inlet chamber 23 formed in the plug casting 13 and disposed exteriorly of the wall 8. The cock 22 presents an inlet branch 24 screw-threaded into the pocket 21, and an outlet branch 25 coupled to the chamber 23 by a readily disconnectible union 26. The nozzle 17 is removable for inspection or replacement through an aperture which opens into the chamber 23 and which is normally closed by a removable screw-threaded plug 27. Regulation of the quality of the combustible mixture delivered into the burner tube 14 is effected by adjustment of a by-pass valve 28 controlling a by-pass 29 connecting the chamber 23 with the chamber 16 and opening into the chamber 16 by way of an annular space 30 surrounding the nozzle 17.

Combustion-supporting air at super-atmospheric pressure is supplied to an air space 9 common to a plurality of burners, as shown in Figs.

5 and 6, by a power-driven fan 31 surmounting the oven structure.

The fit of the plug 13 within the bore 12 of the box 7 may be such that a continuous slight leakage of air takes place to the atmosphere and to the interior of the baking chamber past the inter-engaging surfaces of the bore 12 and the plug 13.

The floating plate 11 overlaps and closes an aperture 32 in the wall 8 and carries externally of the space 9 an annular sealing channel 33 which overlaps the junction of the plate 11 with the wall 8. The burner may be viewed and lit through a sight-hole 34 closed normally by a door 35 pivoted to the plate 11 and slidable between the inner face of the plate 11 and a spring-pressed sealing ferrule 36 slidable in a hole 37 in the box 7.

To permit withdrawal of the burner unit from the oven, for inspection or repair, it is necessary only to uncouple the union 26 so as to disconnect the injector body from the cock 22, after which the burner unit may be withdrawn bodily.

The nozzles 38 are held in non-threaded holes 39 in the tube 14 by a channelled strip 40 pinned to the tube 14 and formed with transverse slots 41 which register with and slightly overlap the nozzles 38, end parts 42 of the slots 41 extending beyond the peripheries of the nozzles to form outlets from the channel space 43 defined between the tube 14 and the strip 40. Combustible mixture is supplied to the space 43 from the tube 14 through small passages 44. As will be understood, the arrangement is such that a flame applied to the nearest of the nozzles 38 will travel along the burner tube and light up the other nozzles 38, the mixture within the space 43 acting, in effect, as a fuse.

I claim:—

1. In a gas-fired baking oven having an inner wall and an outer wall, an open-ended distance box interposed between said walls, a third wall forming with said outer wall an air space, an open-ended distance box interposed between said third wall and said outer wall, said second mentioned distance box aligned with said first mentioned distance box, a tubular gas burner extending through said distance boxes into the interior of the oven, an injector for supplying a mixture of gas and air to said burner, said injector comprising a body part within said second mentioned distance box and means for supplying air to said air space and for maintaining super-atmospheric pressure in said air space, said body part and said second mentioned distance box being provided with registering apertures forming the sole passage for air at super-atmospheric pressure from said air space to said body part.

2. In a baking oven, a wall exterior of said oven, a distance box, open at each end, interposed between and spacing said wall from the oven, a fuel burner extending through said distance box into the interior of the oven, said burner including a body part mounted in said distance box, said body part having an interior fuel-and-air-mixing space, a fuel injector for introducing fuel into said interior space, said distance box and said body part having aligned openings forming passages from the space between said exterior wall and said oven to the interior space of said body member, said passages forming the sole means for passing combustion air to said burner, and means for maintaining a super-atmospheric pressure in the space between said exterior wall and said oven, whereby air therein will be caused to flow through said space into the interior space of the body member to mix with fuel therein.

3. In a baking oven, a wall exterior of said oven, a distance box, open at each end, interposed between and spacing said wall from the oven, a fuel burner extending through said distance box into the interior of the oven, said burner including a body part having a portion of its periphery conforming to the shape of the interior of said distance box and cooperating therewith to close the passage through the same against free passage of air, said body part having an interior fuel-and-air-mixing space, means for introducing fuel into said interior space, said distance box and said body part having aligned openings forming a passage from the space between said exterior wall and said oven to the interior space of said body member, and means for maintaining a super-atmospheric pressure in the space between said exterior wall and said oven whereby air therein will be caused to flow through said passage into the interior space of the body member to mix with fuel therein.

GEORGE KEITH.